US012522512B2

United States Patent
Yang et al.

(10) Patent No.: US 12,522,512 B2
(45) Date of Patent: Jan. 13, 2026

(54) METHOD FOR PREPARING GAMMA-GALLIUM OXIDE NANOMATERIAL

(71) Applicant: NINGBO UNIVERSITY OF TECHNOLOGY, Ningbo (CN)

(72) Inventors: Weiyou Yang, Ningbo (CN); Dongdong Zhang, Ningbo (CN); Hao Yu, Ningbo (CN)

(73) Assignee: NINGBO UNIVERSITY OF TECHNOLOGY, Ningbo (CN)

( * ) Notice: Subject to any disclaimer, the term of this patent is extended or adjusted under 35 U.S.C. 154(b) by 837 days.

(21) Appl. No.: 17/756,100

(22) PCT Filed: Aug. 24, 2020

(86) PCT No.: PCT/CN2020/110846
§ 371 (c)(1),
(2) Date: May 17, 2022

(87) PCT Pub. No.: WO2022/021518
PCT Pub. Date: Feb. 3, 2022

(65) Prior Publication Data
US 2022/0402768 A1 Dec. 22, 2022

(30) Foreign Application Priority Data
Jul. 29, 2020 (CN) .......................... 202010745842.5

(51) Int. Cl.
*C01G 1/00* (2006.01)
*B82Y 40/00* (2011.01)

(52) U.S. Cl.
CPC ............... *C01G 1/00* (2013.01); *B82Y 40/00* (2013.01); *C01P 2004/03* (2013.01); *C01P 2004/24* (2013.01)

(58) Field of Classification Search
None
See application file for complete search history.

(56) References Cited

U.S. PATENT DOCUMENTS

2020/0087802 A1* 3/2020 Qurashi .................... C25B 1/04

FOREIGN PATENT DOCUMENTS

| CN | 1199018 A | 11/1998 |
|----|-----------|---------|
| CN | 107584112 A | 1/2018 |

(Continued)

OTHER PUBLICATIONS

Liu, B., et al. Template approach to crystalline GaN nanosheets. Nano Lett. 2017, 17, 3195-3201. (Year: 2017).*

(Continued)

*Primary Examiner* — Anthony J Zimmer
*Assistant Examiner* — Zachary John Baum
(74) *Attorney, Agent, or Firm* — INNOVATION CAPITAL LAW GROUP, LLP; Vic Lin

(57) ABSTRACT

A method for preparing a $\gamma$-$Ga_2O_3$ nanomaterial, comprising a step of treating a mixture comprising a gallium element, water, and an organic solvent with ultrasound. The preparation process and equipment requirements are simple, the cost of materials is low, there are fewer experimental parameters, and experimental conditions are mild, with no additional heat source and/or pressure being applied. The $\gamma$-$Ga_2O_3$ nanomaterial can be prepared, in kilograms or above, quickly at an ambient temperature and pressure.

15 Claims, 6 Drawing Sheets

(56) References Cited

FOREIGN PATENT DOCUMENTS

| | | | |
|---|---|---|---|
| CN | 108821331 A | | 11/2018 |
| CN | 110404556 A | * | 11/2019 |
| JP | 2009126764 A | | 6/2009 |

OTHER PUBLICATIONS

Playford, H. Y., et al. Characterization of structural disorder in γ—Ga2O3. J. Phys. Chem. C 2014, 118, 16188-16198. (Year: 2014).*

Idrus-Saidi, S. A., et al. Liquid metal-based route for synthesizing and tuning gas-sensing elements. ACS Sens. 2020, 5, 1177-1189. (Year: 2020).*

English translation of CN 110404556 A Description. (Year: 2019).*

Yang, W. Preparation and optical properties of two-dimensional gallium-based spinel oxide nanomaterials. University of Science and Technology of Chine, Jan. 15, 2019, Abstract and pp. 29-52. (Year: 2019).*

International Search Report dated Apr. 26, 2021 from PCT Application No. PCT/CN2020/110846.

Kumar VB, et al., Ultrasonic cavitation of molten gallium: Formation of micro- and nano-spheres. Ultrasonics Sonochemistry, Nov. 16, 2013, pp. 1166-1173, vol. 21, Issue 3, England.

Kumar, et al., Facile synthesis of gallium oxide hydroxide by ultrasonic irradiation of molten gallium in water. Ultrasonics Sonochemistry, Mar. 21, 2015, pp. 340-344, vol. 26, England.

Wang, et al., Preparation and Characterization of Hydrolyzed Component γ—Ga2O3 for Use in Hydrogen Production by Dimethyl Ether Steam Reforming in Low-Temperature Slurry Bed [J]. Journal of Fuel Chemistry and Technology, Jun. 22, 2018, pp. 666-672, vol. 46, Issue 6, China.

Yang, Preparation and optical properties of two-dimensional gallium-based spinel oxide nanomaterials[D]. University of Science and Technology of China, Jan. 15, 2019, pp. 29-32, vol. 1, China.

* cited by examiner

US 12,522,512 B2

METHOD FOR PREPARING GAMMA-GALLIUM OXIDE NANOMATERIAL

TECHNICAL FIELD

The invention belongs to the technical field of the preparation of γ-Ga$_2$O$_3$ nanomaterials, and relates to a method for preparing a novel γ-Ga$_2$O$_3$ nanomaterial.

BACKGROUND ART

Ga$_2$O$_3$ nanomaterial, due to its unique physical and chemical properties, has a broad prospect in practical applications, for example, applications in high-performance catalysts, energy-storage devices, and magnetic and optical devices. It has become a hot spot in current advanced functional material researches. As the fourth-generation semiconductor, Ga$_2$O$_3$ has five different phases, namely, α, β, γ, δ, and ε. However, as one type of Ga$_2$O$_3$, metastable-state γ-Ga$_2$O$_3$ hasn't been fully studied due to its harsh synthesis conditions, such as high temperature and/or high pressure, long reaction time, and poor separation effect. For example, Patent Application JP2009-126764A discloses a method for preparing γ-Ga$_2$O$_3$, including the step of transforming β-Ga$_2$O$_3$ into γ-Ga$_2$O$_3$ in an alkaline aqueous solution at a high temperature above 200° C. and a high pressure above 10 MPa. A journal article (Wang Dongsheng, Zhang Suling, Wei Lei et. al., Preparation and Characterization of Hydrolyzed Component γ-Ga$_2$O$_3$ for Use in Hydrogen Production by Dimethyl Ether Steam Reforming in Low-Temperature Slurry Bed ( ) [J]. Journal of Fuel Chemistry and Technology, 2018(6):666-672) discloses obtaining γ-Ga$_2$O$_3$ by thermally treating a GaOOH precursor at a high temperature of 500° C. All these preparation methods need to be performed at high temperature and/or high pressure, but with low yield of prepared products, which is not applicable to commercialized mass production and shows great limitation.

Mild reactions at normal temperature and normal pressure have always been studied and concerned by many scholars in China and abroad. These reactions are typically featured with simple equipment, mild synthesis processes, strong controllability, and good process repeatability. Common mild reactions at normal temperature and normal pressure include an electrochemical deposition method, a ball milling method, a sonochemical method, etc. Energy for an ultrasonically induced chemical reaction is mainly sourced from hot spots formed in an acoustic cavitation process (i.e., the formation, growth, and breakage of a bubble in liquid), in which the low energy density of a sound field is greatly concentrated. When a bubble breaks, the effective temperature reached is up to 5200 K, and the sound pressure is greater than 20 MPa. Meanwhile, both heating rate and cooling rate during the breakage of a cavitation bubble are greater than $10^{10}$ K/s. The sonochemical reaction will become an effective approach to synthesis of a gallium oxide nanomaterial.

SUMMARY OF THE INVENTION

In view of the defects present in the existing methods for synthesizing the γ-Ga$_2$O$_3$ nanomaterial, the invention provides a method for preparing a γ-Ga$_2$O$_3$ nanomaterial in kilograms or above by ultrasonic treatment at an ambient temperature and pressure without an additional heat source and/or pressure applied.

The above object of the invention is achieved by means of a technical solution as follows:

a method for preparing a γ-Ga$_2$O$_3$ nanomaterial, including a step of treating a mixture including a gallium element, water, and an organic solvent with ultrasound.

In some embodiments of the method described in the invention, the method for preparing the γ-Ga$_2$O$_3$ nanomaterial is performed at a temperature $\leq 45°$ C. and a pressure $\leq 150$ KPa.

In some other embodiments of the method described in the invention, the method for preparing the γ-Ga$_2$O$_3$ nanomaterial is performed at a temperature 37° C. and a pressure $\leq 120$ KPa.

In some other embodiments of the method described in the invention, the method for preparing the γ-Ga$_2$O$_3$ nanomaterial is performed at a temperature 30° C. and a pressure $\leq 102$ KPa.

In some embodiments of the method described in the invention, the purity of the gallium element is $\geq 90\%$. Further preferably, the purity of the gallium element is $\geq 95\%$. Further preferably, the purity of the gallium element is $\geq 99\%$.

In some embodiments of the method described in the invention, the gallium element is solid or liquid.

In some embodiments of the method described in the invention, a ratio of the mass of the gallium element to the total volume of the water and the organic solvent is (0.002-0.3):1, in the unit of g/ml.

In some embodiments of the method described in the invention, a volume ratio of the water to the organic solvent is 1:(0.5-10).

In some embodiments of the method described in the invention, the water is one or more of pure water, deionized water, and ultrapure water.

In some embodiments of the method described in the invention, the organic solvent is a water-soluble organic solvent. Further preferably, the nitrogen-containing organic solvent is the primary-amine organic solvent.

In some embodiments of the method described in the invention, the nitrogen-containing organic solvent is a primary-amine organic solvent and/or a secondary-amine organic solvent. Further preferably, the nitrogen-containing organic solvent is the primary-amine organic solvent.

In some embodiments of the method described in the invention, the primary-amine organic solvent is one or more of methylamine, ethylamine, n-propylamine, isopropylamine, n-butylamine, isobutylamine, tert-butylamine, pentylamine, benzylamine, ethylenediamine, 1,2-propanediamine, 1,3-propanediamine, 1,4-butanediamine, and 1,5-pentanediamine.

In some embodiments of the method described in the invention, the secondary-amine organic solvent is one or more of N-ethylmethylamine, N-methyl-n-propylamine, N-methylisopropylamine, and N-ethyl-n-propylamine.

In some embodiments of the method described in the invention, the nitrogen-containing organic solvent is one or more of ethylenediamine, 1,2-propanediamine, 1,3-propanediamine, 1,4-butanediamine, and 1,5-pentanediamine.

In some embodiments of the method described in the invention, the mixture including the gallium element, the water, and the organic solvent is placed in an ultrasonic instrument for ultrasonic treatment.

In some embodiments of the method described in the invention, the ultrasonic instrument is one or more of an ultrasonic cell disrupter, an ultrasonic cleaner, and an ultrasonic material stripper.

In some embodiments of the method described in the invention, the ultrasonic treatment is performed at a frequency of 20-100 KHz with power $\geq$ 100 W.

In some embodiments of the method described in the invention, the ultrasonic treatment is performed at a frequency of 20-50 KHz with power $\geq$ 400 W.

In some embodiments of the method described in the invention, the method is used to prepare the $\gamma$-$Ga_2O_3$ nanomaterial in milligrams or above.

In some embodiments of the method described in the invention, the method is used to prepare the $\gamma$-$Ga_2O_3$ nanomaterial in kilograms or above Compared with the prior art, the invention has the following advantageous effects:

(1) according to the invention, the $\gamma$-$Ga_2O_3$ nanomaterial is prepared by treating the mixture including the gallium element, water, and organic solvent with ultrasound, without an additional application of heat source and/or pressure applied, and the $\gamma$-$Ga_2O_3$ nanomaterial can be quickly prepared at an ambient temperature and pressure;

(2) the $\gamma$-$Ga_2O_3$ nanomaterial prepared according to the invention has high purity, and high yield up to 90%;

(3) the $\gamma$-$Ga_2O_3$ nanomaterial according to the invention has a simple requirement for preparation process and equipment, and is prepared under low material cost, fewer experiment parameters, and mild experimental conditions with high product purity and yield, and the invention can implement the rapid preparation of the $\gamma$-$Ga_2O_3$ nanomaterial in kilograms or above, such that the invention is applicable to industrialized mass production; and (4) the organic solvent used in the invention is preferably one or more of ethylenediamine, 1,2-propanediamine, 1,3-propanediamine, 1,4-butanediamine, and 1,5-pentanediamine, and two amino groups in the organic solvent show a better coordination effect with the Ga element, such that the purity and yield of the $\gamma$-$Ga_2O_3$ nanomaterial can be improved.

DETAILED DESCRIPTION OF THE PREFERRED EMBODIMENTS

Figure 1:
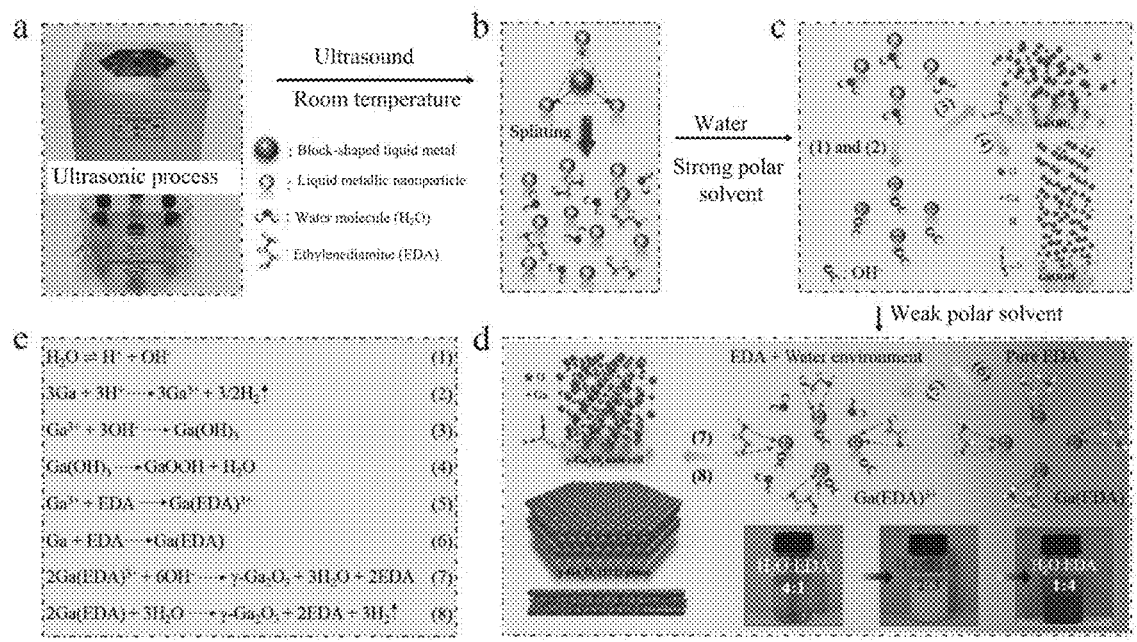
FIG. 1 shows a principle diagram of the preparation of a $\gamma$-$Ga_2O_3$ nanomaterial according to the invention.

The method for preparing the $\gamma$-$Ga_2O_3$ nanomaterial according to the invention will be described below in detail. Unless otherwise defined, a technical or scientific term used herein has the meaning commonly understood by a person of ordinary skills in the technical field of the invention.

A method for preparing a $\gamma$-$Ga_2O_3$ nanomaterial includes a step of treating a mixture including a gallium element, water, and an organic solvent with ultrasound.

Ultrasonic treatment refers to placing a mixture including a gallium element, water, and an organic solvent in an ultrasonic instrument for ultrasonic treatment. Preferably, the mixture of the gallium element, water, and organic solvent is placed in a reaction flask, which is then placed in the ultrasonic instrument for ultrasonic treatment, wherein the reaction flask is a glass container.

Any ultrasonic instrument capable of emitting ultrasound and accommodating the mixture of the gallium element, water, and organic solvent is applicable to the invention. Preferably, the ultrasonic instrument is one or more of an ultrasonic cell disrupter, an ultrasonic cleaner, and an ultrasonic material stripper.

Ultrasound is applied to the mixture including the gallium element, water, and organic solvent, wherein the applied ultrasonic frequency is preferably 20-100 KHz, and the ultrasonic power is preferably $\geq$ 100 W. When the $\gamma$-$Ga_2O_3$ nanomaterial is prepared in a large scale, the ultrasonic treatment frequency is preferably 20-50 KHZ, and the ultrasonic power is preferably $\geq$ 400 W. When the same ultrasonic instrument is used, the ultrasonic treatment time varies depending on the ultrasonic power. The higher the applied ultrasonic power, the quicker the preparation of the $\gamma$-$Ga_2O_3$ nanomaterial, and the shorter the ultrasonic treatment time. The ultrasonic power can be regulated such that the ultrasonic treatment time is preferably within 1-20 h, further preferably 2-10 h, and even further preferably 2-7 h.

The melting point of the gallium element is 29.8° C. When the ambient temperature is higher than 29.8° C., the gallium element is liquid, and when the ambient temperature is lower than 29.8° C., the gallium element is solid. The gallium element for the ultrasonic treatment can be either a liquid or solid, and its form depends on the ambient temperature. The purity of the gallium element is preferably $\geq$ 95%, and further preferably $\geq$ 99%. The higher the purity of the gallium element, the higher the probability of obtaining a high-purity $\gamma$-$Ga_2O_3$ nanomaterial.

The additive amount of the gallium element is not specifically limited. Preferably, a ratio of the mass of the gallium element to the total volume of the water and organic solvent is (0.002-0.3):1, in the unit of g/ml. The smaller the additive amount of the gallium element with respect to the total volume of the water and organic solvent, the higher the reaction speed.

Water acts as a reaction medium and also as an oxygen source for preparing the $\gamma$-$Ga_2O_3$ nanomaterial. The water used in the invention is not specifically limited, and industrial and domestic water containing few ionic impurities is also usable. Preferably, the water is one or more of pure water, deionized water, and ultrapure water. The pure water refers to water containing no impurity or bacteria; the deionized water refers to pure water obtained by removing ionized-state impurities from water by an ion-exchange resin; and the ultrapure water is defined as water produced, at 25° C. and with the electrical resistivity ⩾18 MΩ*cm, by distillation, deionization by an ion-exchange resin, reverse osmosis, nanomembrane filtration, and other suitable super-critical fine techniques.

Under the high energy produced by ultrasonic cavitation, water as a highly polar solvent has a strong electrostatic interaction with a metastable-state solute, such that the metastable-state solute can be favorably dissolved, leading to failed nucleation and precipitation of a metastable-state solute crystal. In the invention, the water and the organic solvent are added at the same time. The organic solvent is preferably a water-soluble organic solvent, which is a poor solvent for the metastable-state solute. The poor solvent would quickly reduce the solubility and increase the supersaturation degree of the metastable-state solute, and the surface energy of the solution would be increased here; and in a nucleation stage, when the solution is in a supersaturation state, the number of crystals increases but with reduced diameter, both the increase in crystal number and the reduction in crystal size would increase the total surface energy of the system, such that surplus energy in a solution phase is consumed to bring the chemical potentials of the solid and solution phases to equilibrium, thereby obtaining a γ-$Ga_2O_3$ nanocrystal. As a preference, a volume ratio of the water to the organic solvent in the invention is 1:(0.5-10).

In the invention, the organic solvent is preferably a nitrogen-containing organic solvent, which refers to an organic solvent containing a nitrogen element in their molecules. The nitrogen-containing organic solvent may act as the poor solvent of the metastable-state solute, moreover, its N element has a strong coordination effect, whereby the elemental substance of Ga can be first protected to form a Ga—N bond to prevent the generation of a GaOOH compound, such that the purity and yield of the γ-$Ga_2O_3$ nanomaterial are increased.

Further preferably, the nitrogen-containing organic solvent is a primary-amine organic solvent and/or a secondary-amine organic solvent. The primary-amine or secondary-amine organic solvent has a N—H bond in their molecules, showing a strong coordination ability.

In the invention, the nitrogen-containing organic solvent is preferably the primary-amine organic solvent, which has a H—N—H bond with a better coordination property.

Preferably, the primary-amine organic solvent is one or more of methylamine, ethylamine, n-propylamine, isopropylamine, n-butylamine, isobutylamine, tert-butylamine, pentylamine, benzylamine, ethylenediamine, 1,2-propanediamine, 1,3-propanediamine, 1,4-butanediamine, and 1,5-pentanediamine.

Preferably, the secondary-amine organic solvent is one or more of N-ethylmethylamine, N-methyl-n-propylamine, N-methylisopropylamine, and N-ethyl-n-propylamine.

Further preferably, the nitrogen-containing organic solvent is one or more of ethylenediamine, 1,2-propanediamine, 1,3-propanediamine, 1,4-butanediamine, and 1,5-pentanediamine. A molecule of each of the ethylenediamine, 1,2-propanediamine, 1,3-propanediamine, 1,4-butanediamine, and 1,5-pentanediamine has an amino group at each side, showing a better coordination effect with the Ga element.

The principle of preparing the γ-$Ga_2O_3$ nanomaterial according to the invention will be explained below, with ethylenediamine as an organic solvent, by way of example. As shown in FIG. 1, before ultrasonic treatment, a liquid metal gallium sample is droplet-shaped, and after the ultrasonic treatment starts, droplets are quickly split into small nano-sized droplets; and if the metal gallium sample is solid, the solid metal gallium quickly melts and forms small nano-sized droplets. When only water is used as a solvent, the metal gallium interacts with H+ decomposed from a $H_2O$ molecule to form a gallium ion, which then reacts with OH— to generate $Ga(OH)_3$, and $Ga(OH)_3$ due to its instability is decomposed into GaOOH. Therefore, when only water is used as the solvent, the generation of GaOOH microrods is only observed. When only ethylenediamine is used as a solvent, the metal gallium (Ga) and the EDA form a Ga(EDA) complex, which cannot not further generate a $Ga_2O_3$ crystal due to the lack of water molecules as an oxygen source in the solution. When EDA and water are used as a mixed solvent, the EDA shows a better affinity to a metal gallium ion $Ga^{3+}$ and Ga than OH—, and thus, $Ga(EDA)^{3+}$ and a Ga(EDA) complex are generated and then decomposed under the action of water molecules and $OH^-$, such that the γ-$Ga_2O_3$ nanomaterial is prepared.

The method for preparing the γ-$Ga_2O_3$ nanomaterial according to the invention can be performed at a temperature ⩽45° C. and a pressure 150 KPa, at a temperature ⩽37° C. and a pressure ⩽150 KPa, at a temperature ⩽30° C. and a pressure ⩽150 KPa, at a temperature ⩽45° C. and a pressure ⩽120 KPa, at a temperature ⩽37° C. and a pressure ⩽120 KPa, at a temperature ⩽30° C. and a pressure≤120 KPa, at a temperature≤45° C. and a pressure≤102 KPa, at a temperature ⩽37° C. and a pressure ⩽120 KPa, or at a temperature≤30° C. and a pressure≤102 KPa.

The method for preparing the γ-$Ga_2O_3$ nanomaterial according to the invention needs no additional application of a heat source and/or pressure. That is, the ultrasonic instrument does not need heating and/or pressure. The ultrasonic treatment can be performed on the mixture including the gallium element, water, and organic solvent at an ambient temperature and pressure.

The method for preparing a nano metal oxide according to the invention can implement the preparation of the γ-$Ga_2O_3$ nanomaterial at a normal temperature and pressure (the normal temperature defined as 25° C., and the normal pressure defined as one standard atmospheric pressure, i.e., 101 kPa).

According to the method for preparing the γ-$Ga_2O_3$ nanomaterial, the γ-$Ga_2O_3$ nanomaterial can be prepared in milligrams or above. The weight of the γ-$Ga_2O_3$ nanomaterial to be prepared depends on the magnitude of treatment capacity of the ultrasonic instrument. The larger the treatment capacity of the ultrasonic instrument, the more the mixture, including the gallium element, water, and organic solvent, to be treated, and the higher the mass of the prepared γ-$Ga_2O_3$ nanomaterial.

According to the invention, a large-capacity ultrasonic instrument may be used to prepare the γ-$Ga_2O_3$ nanomaterial in kilograms or above to realize industrial mass production.

By the method for preparing the γ-$Ga_2O_3$ nanomaterial according to the invention, the prepared γ-$Ga_2O_3$ nanomaterial has a yield ⩾85%, and further preferably, a yield ⩾90%. The yield is calculated by: yield %=actual output of γ-$Ga_2O_3$ nanomaterial/theoretical output of γ-$Ga_2O_3$ nanomaterial"×100%.

The technical solution of the invention will be further described and illustrated hereinafter by specific examples. However, these embodiments are exemplary, and the disclosure of the invention is not limited thereto. Unless otherwise specifically stated, all raw materials used in the following specific examples of the invention are common raw materials in the art, and all methods used in the examples are conventional methods in the art.

In the following examples and comparative examples, the purity of the metal gallium used is 99.9%, the ambient temperature is 32° C., and the ambient pressure is 101.33 KPa.

EXAMPLE 1

6 mL of ultrapure water and 9 mL of ethylenediamine were taken and placed in a glass vial to form a mixed solvent; 1 mmol (69.72 mg) liquid metal gallium was added to the mixed solvent; the glass vial was placed in an ultrasonic two-dimensional material stripper (Scientz-CHF-5A, Scientz, China) for ultrasonic treatment, with the ultrasonic treatment frequency of 40 KHz and the power regulated to be 252 W; the ultrasonic treatment was performed for 4 h under a stirring condition; after the ultrasonic treatment, a resultant was naturally cooled to room temperature and filtered by suction; a solution obtained was stored for cyclic use so as to reduce reagent consumption, and white powder obtained was washed 3 times by using 75 v/v % ethanol solution, and finally dried for 12 h at 80° C. to obtain a $\gamma$-$Ga_2O_3$ nanomaterial. After weighing, the mass of the obtained $\gamma$-$Ga_2O_3$ nanomaterial was 86.02 mg, and the yield was calculated as 91.8%.

EXAMPLE 2

In Example 2, the ultrasonic treatment was performed for 5 h, and other experimental steps were the same as those in Embodiment 1. After weighing, the mass of the obtained $\gamma$-$Ga_2O_3$ nanomaterial was 85.53 mg, and the yield was calculated as 91.3%.

EXAMPLE 3

In Example 3, the ultrasonic treatment was performed for 6 h, and other experimental steps were the same as those in Embodiment 1. After weighing, the mass of the obtained $\gamma$-$Ga_2O_3$ nanomaterial was 85.81 mg, and the yield was calculated as 91.6%.

Figure 2:
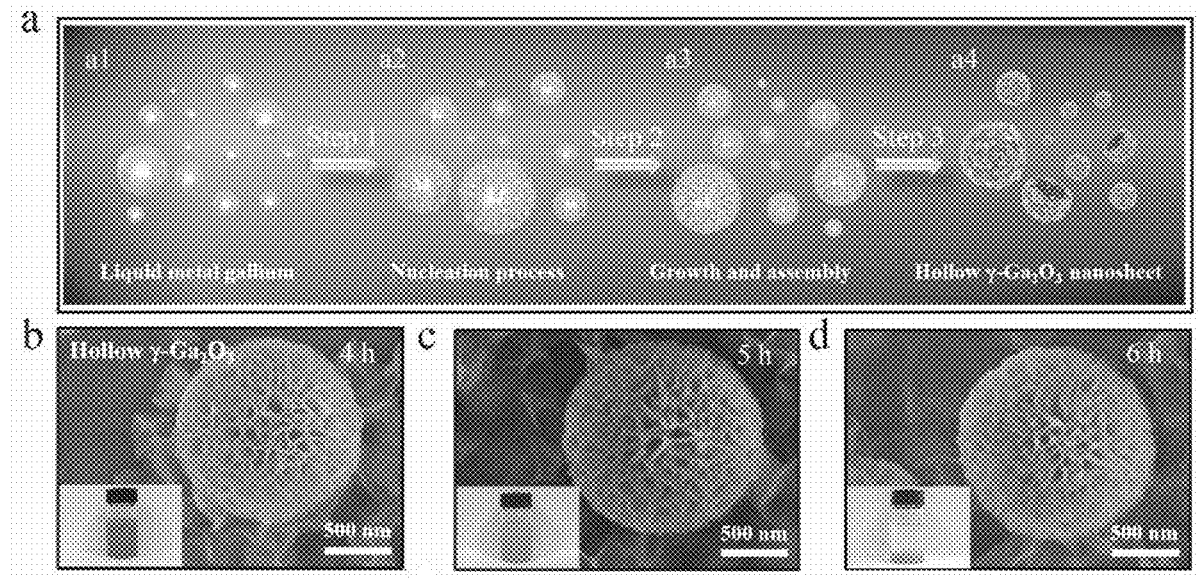
FIG. 2(a) shows a flowchart of the evolution of a $\gamma$-$Ga_2O_3$ nanomaterial over time in an ultrasonic preparation process, and FIGS. 2(b)-(d) respectively show scanning electron microscope (SEM) graphs of $\gamma$-$Ga_2O_3$ nanomaterials obtained after 4 h-, 5 h-, and 6 h-ultrasonic treatment according to Examples 1-3 of the invention.

FIG. 2(a) shows a flowchart of the evolution of the $\gamma$-$Ga_2O_3$ nanomaterial over time. From FIG. 2, it can be seen that a process for synthesizing the $\gamma$-$Ga_2O_3$ nanomaterial is mainly divided into three stages, including nucleation, growth, and assembly. The earlier stage of ultrasonic treatment is mainly a crystal nucleation process, in which small crystal nucleuses are precipitated from solutes. As the time of ultrasonic treatment flies, the crystal nucleuses grow to gradually form large pieces of $\gamma$-$Ga_2O_3$ nanosheets. The grown $\gamma$-$Ga_2O_3$ nanosheets are self-assembled to form a hollow spherical structure in order to reduce the overall formation energy for higher stability. FIGS. 2(b)-(d) respectively show scanning electron microscope (SEM) graphs of $\gamma$-$Ga_2O_3$ nanomaterials obtained after 4 h-, 5 h-, and 6 h-ultrasonic treatment according to Examples 1-3 of the invention. It can be clearly seen that large pieces of $\gamma$-$Ga_2O_3$ nanosheets (the nanosheets are two-dimensional nanomaterials, namely laminar-structure nanomaterials with the transverse dimension greater than 100 nm or even up to several micros and the thickness≤100 nm) are generated, which are self-assembled into a spheric shape. The sample formed by 4-6 h-ultrasonic treatment is stable in structure and form, and changes little over time.

Figure 3:
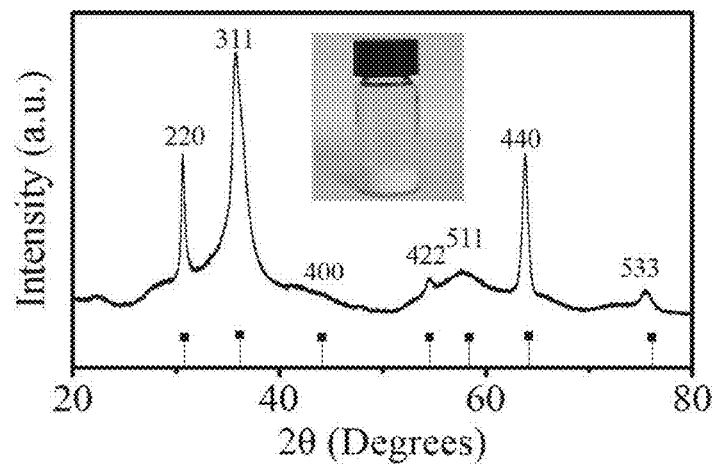
FIG. 3 shows an X-ray diffraction (XRD) spectrogram of the $\gamma$-$Ga_2O_3$ nanomaterial obtained according to Example 3 of the invention.

FIG. 3 shows an X-ray diffraction (XRD) spectrogram of the $\gamma$-$Ga_2O_3$ nanomaterial obtained according to Example 3 of the invention. The XRD spectrogram indicates the gallium oxide obtained according to the invention is of a $\gamma$ phase, which shows a face-centered cubic (FCC) structure and a space group of Fd3m (JCPDS 20-0426) without any impurity peak detected, indicating that a high-purity $\gamma$-$Ga_2O_3$ nanomaterial is obtained according to the invention.

Figure 4:
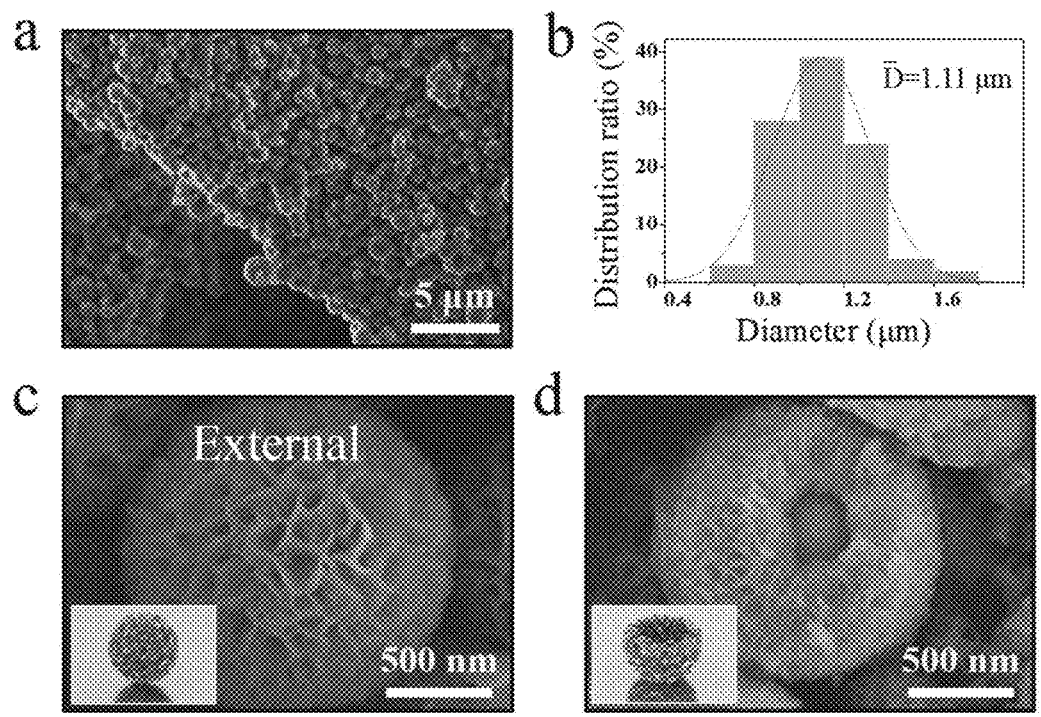
FIG. 4 shows scanning electron microscope (SEM) graphs of the $\gamma$-$Ga_2O_3$ nanomaterial obtained according to Example 3 of the invention.

FIG. 4 shows SEM graphs of the $\gamma$-$Ga_2O_3$ nanomaterial obtained according to Example 3 of the invention. As can be seen from the graphs, the $\gamma$-$Ga_2O_3$ in the form of large nanosheet is obtained by the method provided by the invention, and the $\gamma$-$Ga_2O_3$ nanosheets are self-assembled to form the hollow spherical structure in order to reduce the overall formation energy and tend to be more stable.

Figure 5:
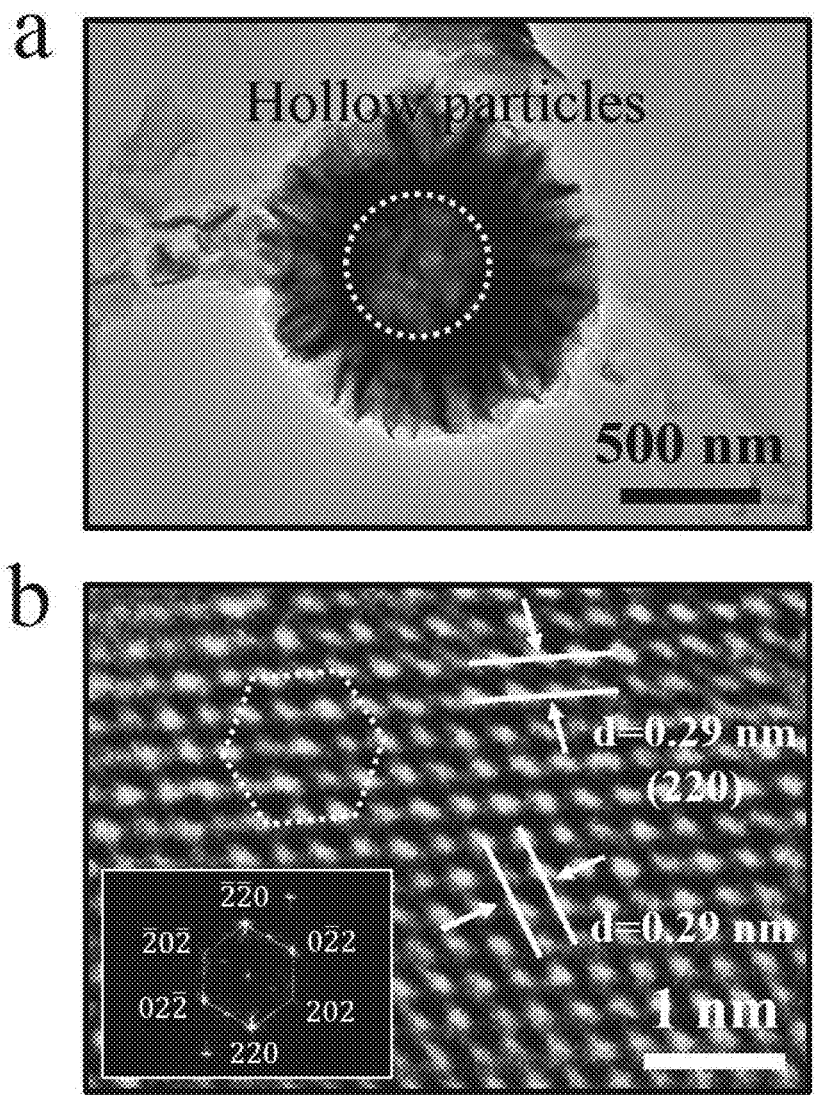
FIG. 5 shows high-resolution transmission electron microscope (HRTEM) graphs of the $\gamma$-$Ga_2O_3$ nanomaterial obtained according to Example 3 of the invention.

FIG. 5 shows high-resolution transmission electron microscope (HRTEM) graphs of the $\gamma$-$Ga_2O_3$ nanomaterial obtained according to Example 3 of the invention. FIG. 5(a) shows the $\gamma$-$Ga_2O_3$ nanosheets self-assembled into the hollow spherical structure, which is the same as that in the SEM graph of FIG. 4. FIG. 5(b) shows a distance of 0.29 nm between adjacent crystal faces, which well matches a spacing d between crystal faces (220) of the face-centered cubit $\gamma$-$Ga_2O_3$.

Figure 6:
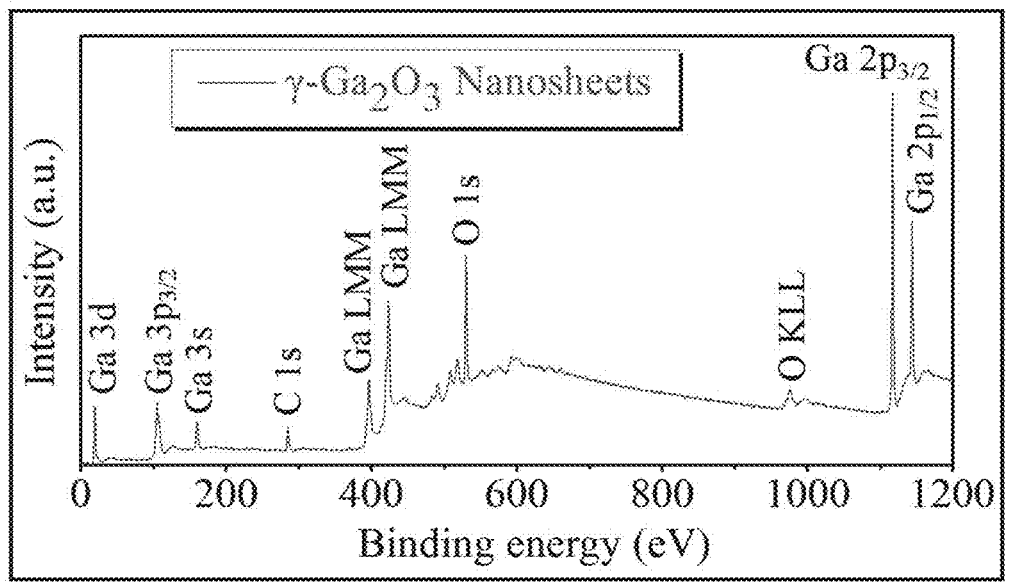
FIG. 6 shows an XPS full-spectrum energy scanning graph, from 0 to 1200 eV, of the $\gamma$-$Ga_2O_3$ nanomaterial obtained according to Example 3 of the invention.

To determine the chemical composition of elements in the $\gamma$-$Ga_2O_3$ nanomaterial, an X-ray photoelectron spectroscopy (XPS) test was carried out. FIG. 6 shows an XPS full-spectrum energy scanning graph, from 0 to 1200 eV, of the $\gamma$-$Ga_2O_3$ nanomaterial obtained according to Example 3 of the invention. In this graph, only elements Ga and O and trace carbon exist, indicating that a high-purity $\gamma$-$Ga_2O_3$ nanomaterial is prepared.

EXAMPLE 4

7.5 mL of ultrapure water and 7.5 mL of ethylenediamine were taken and placed in a glass vial to form a mixed solvent, and a volume ratio of the ultrapure water to the ethylenediamine was 1:1; 1 mmol (69.72 mg) liquid metal gallium was added to the mixed solvent; the glass vial was placed in an ultrasonic two-dimensional material stripper (Scientz-CHF-5A, Scientz, China) for ultrasonic treatment, with the ultrasonic treatment frequency of 40 KHz and the power regulated to be 252 W; the ultrasonic treatment was performed for 6 h under a stirring condition; after the ultrasonic treatment, a resultant was naturally cooled to room temperature and filtered by suction; a solution obtained was stored for cyclic use so as to reduce reagent consumption, and white powder obtained was washed 3 times by using 75 v/v % ethanol solution, and finally dried for 12 h at 80° C. to obtain a $\gamma$-$Ga_2O_3$ nanomaterial. After weighing, the mass of the obtained $\gamma$-$Ga_2O_3$ nanomaterial was 85.02 mg, and the yield was calculated as 90.7%.

EXAMPLE 5

1 mmol (69.72 mg) liquid metal gallium was added to a mixed solution of 3 ml of ultrapure water and 12 ml of ethylenediamine, and a volume ratio of the ultrapure water to the ethylenediamine was 1:4. Other experimental steps were the same as those in Example 4. The $\gamma$-$Ga_2O_3$ nanomaterial was obtained. After weighing, the mass of the obtained $\gamma$-$Ga_2O_3$ nanomaterial was 86.33 mg, and the yield was calculated as 92.1%.

EXAMPLE 6

1 mmol (69.72 mg) liquid metal gallium was added to a mixed solution of 5 ml of ultrapure water and 10 ml of ethylenediamine, and a volume ratio of the ultrapure water to the ethylenediamine was 1:2. Other experimental steps were the same as those in Example 4. The γ-$Ga_2O_3$ nanomaterial was obtained. After weighing, the mass of the obtained γ-$Ga_2O_3$ nanomaterial was 86.15 mg, and the yield was calculated as 91.9%.

COMPARATIVE EXAMPLE 1

1 mmol (69.72 mg) liquid metal gallium was added to 15 ml of ultrapure water. Other experimental steps were the same as those in Example 4. A powder material was obtained.

COMPARATIVE EXAMPLE 2

1 mmol (69.72 mg) liquid metal gallium was added to 15 ml of ethylenediamine. Other experimental steps were the same as those in Example 4. A powder material was obtained.

COMPARATIVE EXAMPLE 3

1 mmol (69.72 mg) liquid metal gallium was added to a mixed solution of 12 ml of ultrapure water and 3 ml of ethylenediamine, and a volume ratio of the ultrapure water to the ethylenediamine was 4:1. Other experimental steps were the same as those in Example 4. A powder material was obtained.

Figure 7:
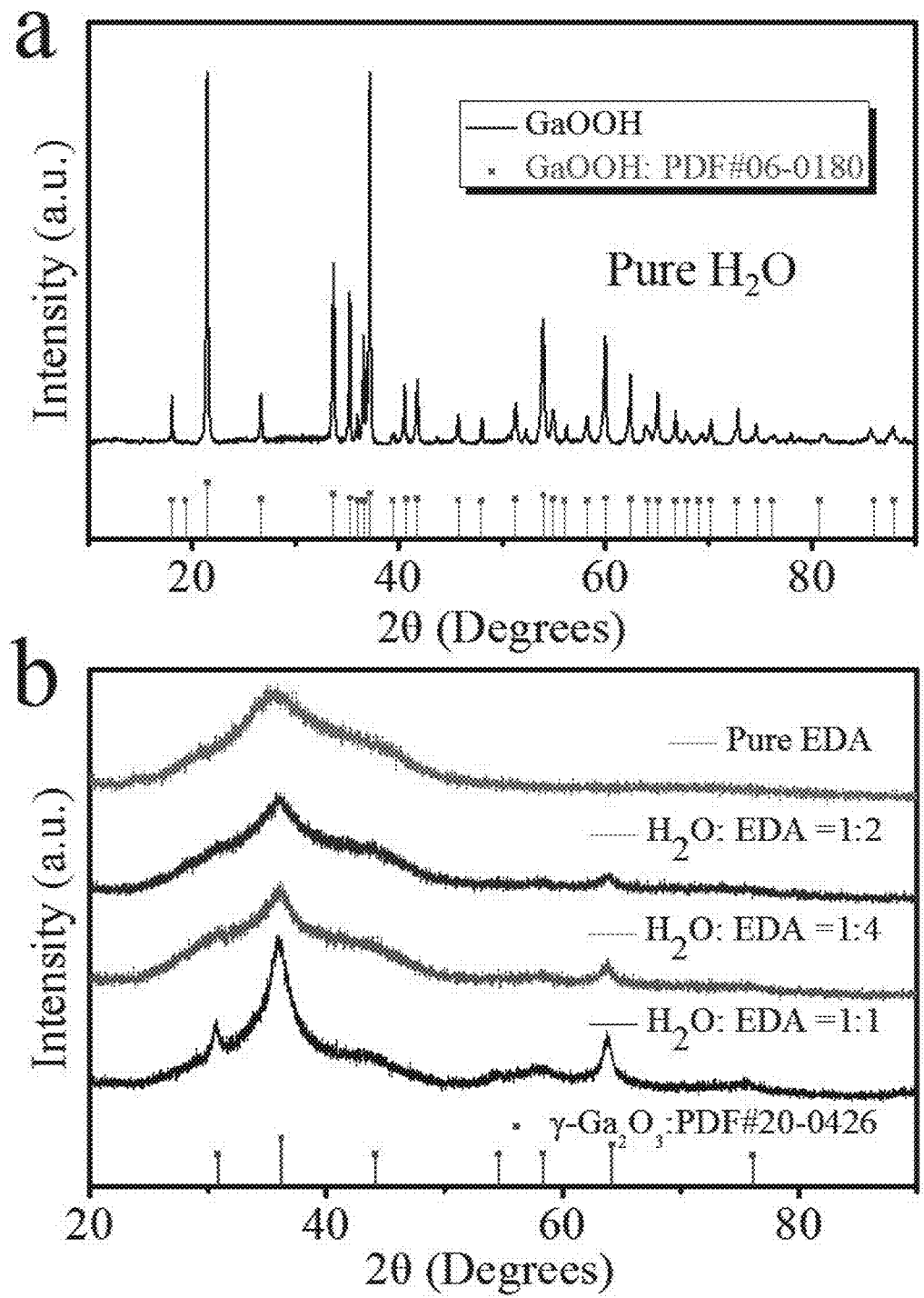
FIG. 7 shows XRD spectrograms of products prepared according to Examples 4-6 and Comparative Examples 1-2 of the invention.

FIG. 7 show XRD spectrograms of products prepared according to Examples 4-6 and Comparative Examples 1-2 of the invention. FIG. 7(a) shows the XRD spectrogram of the product prepared according to Comparative Example 1 of the invention. From this XRD spectrogram, it can be seen that the product prepared according to Comparative Example 1 is GaOOH. In Comparative Example 1, only water was used as a solvent, the metal gallium interacted with H+ decomposed from a $H_2O$ molecule to form a gallium ion, which then reacted with OH— to generate $Ga(OH)_3$, and $Ga(OH)_3$ due to its instability was decomposed into GaOOH. Therefore, when only water was used as the solvent in Comparative Example 1, the generation of GaOOH microrods was only observed. FIG. 7(b) shows the XRD spectrogram of the products prepared according to Examples 4-6 and Comparative Example 2 of the invention. From this spectrogram, it can be seen that the products prepared according to Examples 4-6 are γ-$Ga_2O_3$, but no γ-$Ga_2O_3$ is prepared in Comparative Example 2. In Comparative Example 2, only EDA existed, a complex formed by the metal gallium (Ga) and the EDA couldn't further generate a γ-$Ga_2O_3$ crystal due to the lack of an oxygen source in the solution. Therefore, only a Ga(EDA) complex was obtained in Comparative Example 2, and no γ-$Ga_2O_3$ was prepared.

Figure 8:
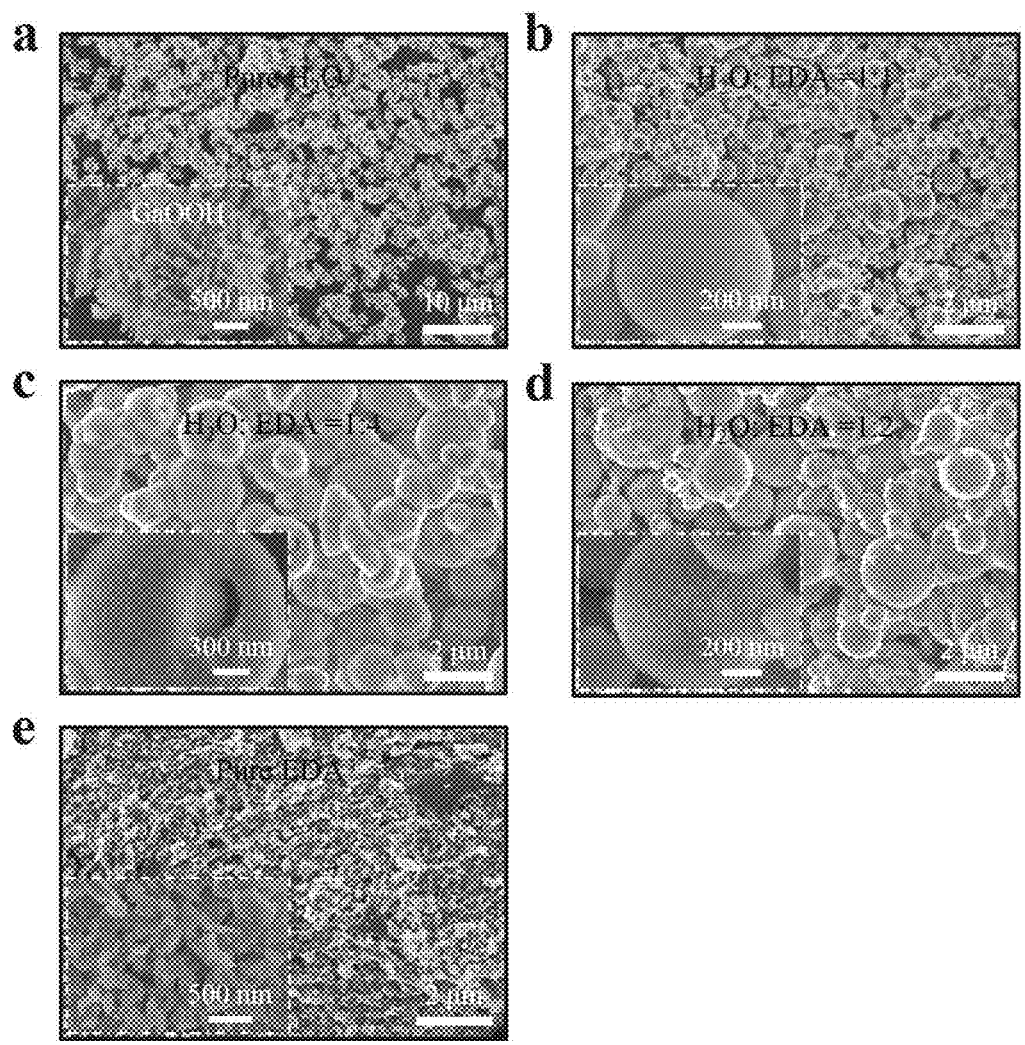
FIG. 8 shows SEM graphs of products prepared according to Examples 4-6 and Comparative Examples 1-2 of the invention.

FIG. 8 shows SEM graphs of the products prepared according to Examples 4-6 and Comparative Examples 1-2 of the invention. FIGS. 8(b)-(d) respectively show the SEM graphs of the products prepared according to Examples 4-6 of the invention. From this SEM graph, it can be seen that the γ-$Ga_2O_3$ was obtained in the form of nanosheet, and the γ-$Ga_2O_3$ nanosheets were self-assembled to form the hollow spherical structure in order to reduce the overall formation energy and tend to be more stable. γ-$Ga_2O_3$ in the form of nanosheet is not observed in FIGS. 8(a) and (e).

In Comparative Example 3, a volume ratio of the ultrapure water used to the ethylenediamine is 4:1. After the ultrapure water and the ethylenediamine react under ultrasound, a resulting solution was still in a clear state, without any crystal precipitated. This is probably because a large amount of $H_2O$ as a highly polar solvent is a good solvent for a metastable-state γ-$Ga_2O_3$ crystal in an ultrasonic process, and due to strong electrostatic interaction between the solvent and a solute and high energy produced from ultrasonic cavitation, nucleation and precipitation are impossible for the γ-$Ga_2O_3$ crystal. Therefore, in Comparative Example 3 where the ratio of the water to the ethylenediamine is 4:1, only Ga(EDA)3+ was generated, and the γ-$Ga_2O_3$ nanomaterial was not obtained.

EXAMPLE 7

In this example, many γ-$Ga_2O_3$ nanomaterials were synthesized. A mixed solution of 6 L of ultrapure water and 9 L of ethylenediamine, as a solvent, was taken by a 20 L large narrow-mouth glass flask; 20 mol (1394 g) liquid metal gallium was added and mixed well; an ultrasonic cleaner (SB-1500DT, Scientz, China) was used to perform ultrasonic treatment for 5 h, with the ultrasonic treatment frequency of 28 KHz and the power regulated to be 1050 W; after the ultrasonic treatment, a resultant was naturally cooled to room temperature and filtered by suction; a solution obtained was stored for cyclic use so as to reduce reagent consumption, and white powder obtained was washed 3 times by using 75 v/v % ethanol solution, and finally dried for 12 h at 80° C. to obtain a γ-$Ga_2O_3$ nanosheet material. After weighing, the mass of the obtained γ-$Ga_2O_3$ nanosheet material was 1738 g, and the yield was calculated to be 92.7%.

EMBODIMENT 8

In this example, many γ-$Ga_2O_3$ nanomaterials were synthesized. A mixed solution of 5 L of ultrapure water and 9 L of propanediamine, as a solvent, was taken by a 20 L large narrow-mouth glass flask; 20 mol (1394 g) liquid metal gallium was added and mixed well; an ultrasonic cleaner (SB-1500DT, Scientz, China) was used to perform ultrasonic treatment for 5.5 h, with the ultrasonic treatment frequency of 28 KHz and the power regulated to be 1050 W; after the ultrasonic treatment, a resultant was naturally cooled to room temperature and filtered by suction; a solution obtained was stored for cyclic use so as to reduce reagent consumption, and white powder obtained was washed 4 times by using 70 v/v % ethanol solution, and finally dried for 15 h at 80° C. to obtain a γ-$Ga_2O_3$ nanosheet material. After weighing, the mass of the obtained γ-$Ga_2O_3$ nanosheet material was 1711 g, and the yield was calculated to be 91.3%.

By the method for preparing the γ-$Ga_2O_3$ nanomaterial according to the invention, a product in kilograms or above can be prepared at an ambient temperature and pressure, the preparation of the γ-$Ga_2O_3$ nanomaterial is implemented easily, quickly, and massively, and the industrial mass production is easy to realize.

The specific embodiments described herein are merely for exemplifying the spirit of the invention. Those skilled in the art to which the invention belongs can make a variety of modifications or supplementations or substitutions in a similar way to the specific embodiments as described, which is deemed as not departing from the spirit of the invention or not going beyond the scope defined by the accompanying claims.

What is claimed is:

1. A method for preparing a γ-Ga$_2$O$_3$ nanomaterial comprising:
   treating a mixture comprising a metal gallium, water, and an organic solvent with ultrasound; and
   preparing the γ-Ga$_2$O$_3$ nanomaterial at:
   a temperature≤45° C. and a pressure≤150 kPa;
   a volume ratio of the water to the organic solvent is 1:(0.5-10);
   wherein the organic solvent is a nitrogen-containing organic solvent, the nitrogen-containing organic solvent is ethylenediamine.

2. The method for preparing the γ-Ga$_2$O$_3$ nanomaterial according to claim 1, characterized in that the method for preparing the γ-Ga$_2$O$_3$ nanomaterial is performed at a temperature≤37° C. and a pressure≤120 kPa.

3. The method for preparing the γ-Ga$_2$O$_3$ nanomaterial according to claim 1, characterized in that the method for preparing the γ-Ga$_2$O$_3$ nanomaterial is performed at a temperature≤30° C. and a pressure≤102 kPa.

4. The method for preparing the γ-Ga$_2$O$_3$ nanomaterial according to claim 1, characterized in that the purity of the metal gallium is ≥90%.

5. The method for preparing the γ-Ga$_2$O$_3$ nanomaterial according to claim 4, characterized in that the purity of the metal gallium is ≥95%.

6. The method for preparing the γ-Ga$_2$O$_3$ nanomaterial according to claim 5, characterized in that the purity of the metal gallium is ≥99%.

7. The method for preparing the γ-Ga$_2$O$_3$ nanomaterial according to claim 1, characterized in that the metal gallium is liquid or solid.

8. The method for preparing the γ-Ga$_2$O$_3$ nanomaterial according to claim 1, characterized in that a ratio of the mass of the metal gallium to the total volume of the water and the organic solvent is (0.002-0.3) g:1 mL.

9. The method for preparing the γ-Ga$_2$O$_3$ nanomaterial according to claim 1, characterized in that the water is one or more of pure water, deionized water, and ultrapure water.

10. The method for preparing the γ-Ga$_2$O$_3$ nanomaterial according to claim 1, characterized in that the mixture comprising the metal gallium, the water, and the organic solvent is placed in an ultrasonic instrument for ultrasonic treatment.

11. The method for preparing the γ-Ga$_2$O$_3$ nanomaterial according to claim 10, characterized in that the ultrasonic instrument is one or more of an ultrasonic cell disrupter, an ultrasonic cleaner, and an ultrasonic material stripper.

12. The method for preparing the γ-Ga$_2$O$_3$ nanomaterial according to claim 1, characterized in that the ultrasonic treatment is performed at a frequency of 20-100 kHz with power≥100 W.

13. The method for preparing the γ-Ga$_2$O$_3$ nanomaterial according to claim 1, characterized in that the ultrasonic treatment is performed at a frequency of 20-50 kHz with power≥400W.

14. The method for preparing the γ-Ga$_2$O$_3$ nanomaterial according to claim 1, characterized in that the method is used to prepare the γ-Ga$_2$O$_3$ nanomaterial in milligrams or above.

15. The method for preparing the γ-Ga$_2$O$_3$ nanomaterial according to claim 1, characterized in that the method is used to prepare the γ-Ga$_2$O$_3$ nanomaterial in kilograms or above.

* * * * *